(12) United States Patent
Schopf

(10) Patent No.: US 7,259,749 B2
(45) Date of Patent: Aug. 21, 2007

(54) TOUCH MEASUREMENT SYSTEM

(75) Inventor: Reinhold Schopf, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 758 days.

(21) Appl. No.: 10/802,608

(22) Filed: Mar. 17, 2004

(65) Prior Publication Data

US 2004/0183789 A1    Sep. 23, 2004

(30) Foreign Application Priority Data

Mar. 22, 2003   (DE) ................. 103 12 884

(51) Int. Cl.
*G09G 5/08*    (2006.01)
(52) U.S. Cl. ...................... 345/158; 345/173
(58) Field of Classification Search ......... 345/158–179
See application file for complete search history.

(56) References Cited

U.S. PATENT DOCUMENTS 4,509,266 A * 4/1985 Cusack ........................ 33/561
4,518,958 A * 5/1985 Cook et al. ................. 340/679
4,779,319 A * 10/1988 Juengel .......................... 29/57
4,978,857 A * 12/1990 Juengel ....................... 250/551

FOREIGN PATENT DOCUMENTS

DE         3422180        12/1984

* cited by examiner

*Primary Examiner*—Richard Hjerpe
*Assistant Examiner*—Jean Leserance
(74) *Attorney, Agent, or Firm*—Abelman, Frayne & Schwab

(57) ABSTRACT

A touch measurement system includes a touch probe for detecting touching of a workpiece by a touch probe stylus and including at least one sender for emitting an infra-red light in response to detection of the touching, and a receiving unit including a housing having a window permeable to an infra-red light and provided with an electro-conductive coating for shielding an interior of the housing from electro-magnetic interferences, and an infra-red light receiver for receiving the infra-red light emitted by the sender of the touch probe, and a unit for processing the infra-red light received by the receiver, with both the receiver and the processing unit being located in the housing interior.

20 Claims, 3 Drawing Sheets

TOUCH MEASUREMENT SYSTEM

BACKGROUND OF THE INVENTION

1. Field of the Invention

The present invention relates to a touch measurement system for measuring a workpiece and including a touch probe for detecting touching of the workpiece by a touch probe stylus and having at least one sender for emitting an infra-red light in response to detection of the touching, and a receiving unit including a housing having a window permeable to an infra-red light, an infra-red light receiver located in the housing interior for receiving the infra-red light emitted by the sender of the touch probe, and a unit likewise located in the housing interior for processing the infra-red light received by the receiver.

2. Description of the Prior Art

Touch measurement systems of the type described above are used for determination of a relative position or surface coordinates of a workpiece or a tool of a machine tool or of a coordinate-measuring machine upon touching. On the touch probe, at least one sender for emitting infra-red light in response to the touching is arranged. The infra-red light, which is emitted by the sender, is transmitted to a spaced from the touch probe, receiving unit that converts the received infra-red light into a trigger signal and transmits the trigger signal to the motion control that controls the displacement of the touch probe.

A touch measurement system of the type discussed above is disclosed in German Patent DE-34 22 180 C2. The receiving unit has a housing the opening of which is closed by a window permeable to infra-red light. In the window, there is arranged an infra-red filter for screening or eliminating visible light.

The touch measurement systems of the type described above should meet higher and higher requirements to their reliability. On one hand, the touch measurement systems should be able to function with the distance between the touch probe and the receiving unit increasing more and more and, on the other hand, the touch measurement systems become subjected to ever increasing influence of interference-creating devices, e.g., powerful motors.

Accordingly, an object of the present invention is to provide a touch measurement system with an increased functional reliability.

SUMMARY OF THE INVENTION

This and other objects of the present invention, which will become apparent hereinafter, are achieved by providing the housing window with means that shield the housing interior from electro-magnetic interferences.

Advantageously, the shielding means is formed as an electro-conducting coating which is provided on the inner side or surface of the window.

According to an advantageous embodiment of the present invention, the housing has a base body connected with a reference potential, and the window has an attachment flange connectable with a circumferential mounting flange provided on the base body for connecting the window with the base body. With the electro-conducting coating also covering the inner end surface of the attachment flange, the coating becomes electrically connected with the base body in an assembled condition of the base body with the window.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENTS

Figure 1:
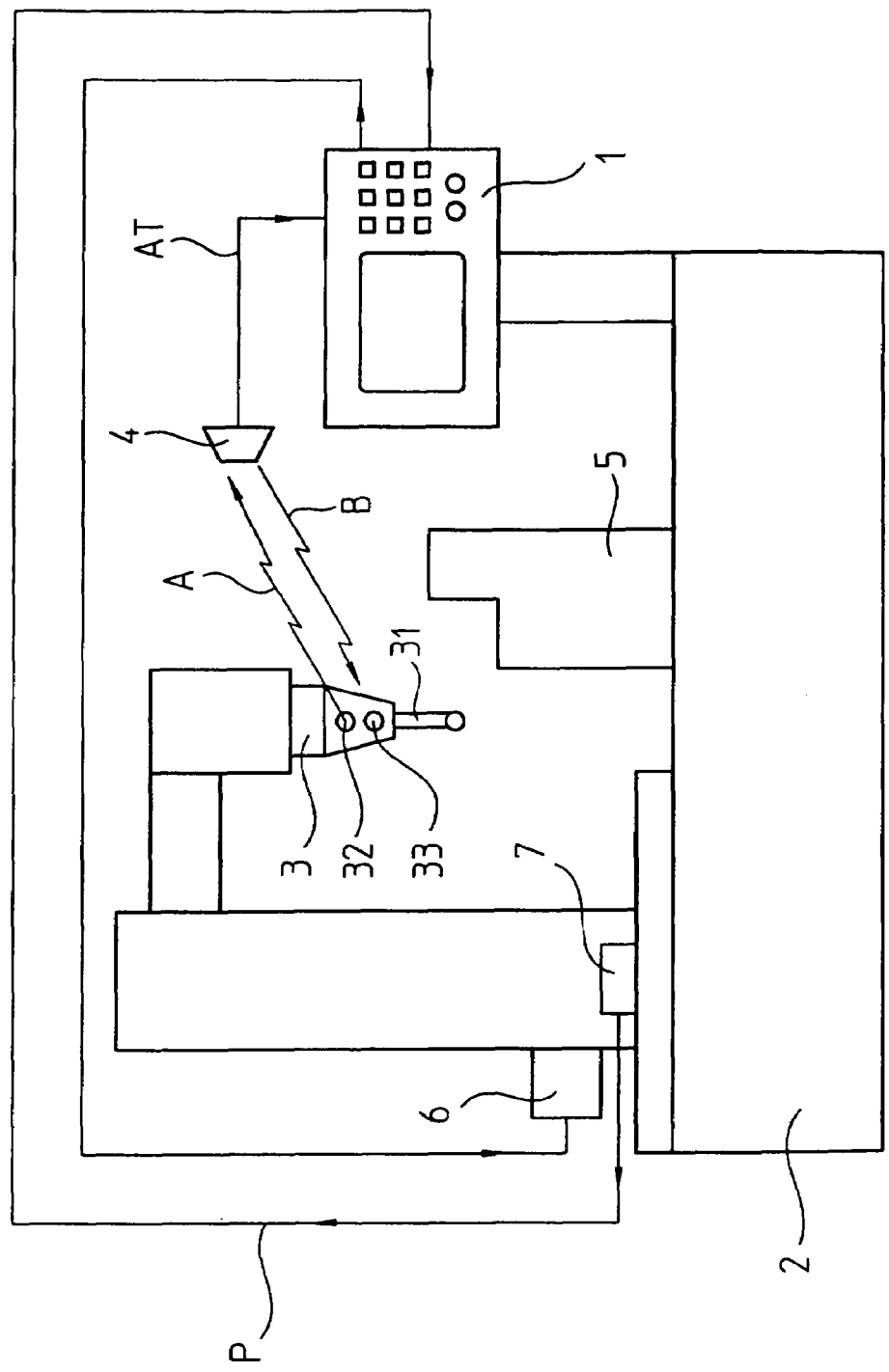
FIG. 1. a schematic view of a touch measurement system according to the present invention mounted on a numerically controlled (NC) machine-tool.

Touch measurement systems according to the present invention cooperate with motion control of different machines such as, e.g., machine-tools or coordinate-measurement machines. FIG. 1 shows a machine-tool 2 which is controlled by a numerical control 1, with a touch measurement system supported thereon. The touch measurement system shown in FIG. 1 includes a touch probe 3 and a receiving unit 4.

For measuring a workpiece 5, the touch probe 3 is displaced relative to the workpiece 5, with the movement of the touch probe 3 being numerically controlled by the control 1 of the NC machine tool 2. For displacing-the touch probe 3, there is provided at least one drive 6 that is connected with the numerical control 1. The displacement of the touch probe 3 is sensed by a position measurement device 7. When a stylus 31 of the touch probe 3 touches the workpiece 5, a touch signal is generated in the touch probe 3. The touch signal is generated in per se known manner by a motion sensor, e.g., formed as light barrier, which detects deviation of the stylus 31. The touch signal is transformed by a sender 32 in an infra-red light A and is transmitted cordlessly to the receiving unit 4. The receiving unit 4 has at least one infra-red receiver 41 for receiving the infra-red light A. The infra-red light A is transformed in a triggering signal AT that is transmitted to the control 1 leading to shut-down of the drive 6 and to transfer or storage of an instantaneous position P that was sensed by the position measurement device 7 at a point of time the workpiece 5 was touched by the stylus 31.

Figure 4:
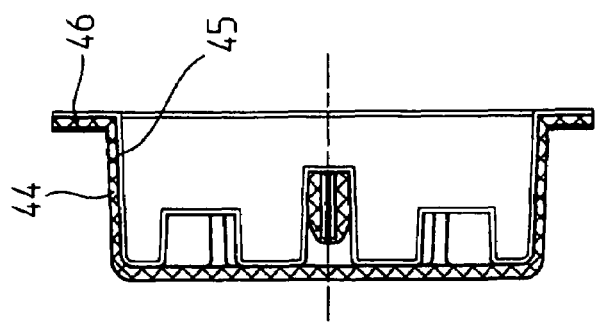
FIG. 4. a cross-sectional view of a window of the receiving unit shown in FIG. 2 with a coating shown with an enlarged, in comparison with actual, thickness.
Figure 3:
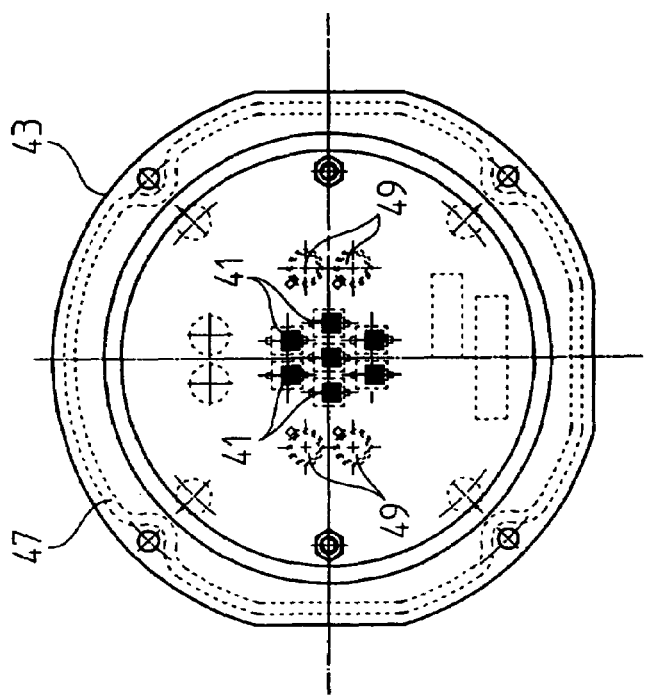
FIG. 3. a cross-sectional view along line 3-3 in FIG. 2.
Figure 2:
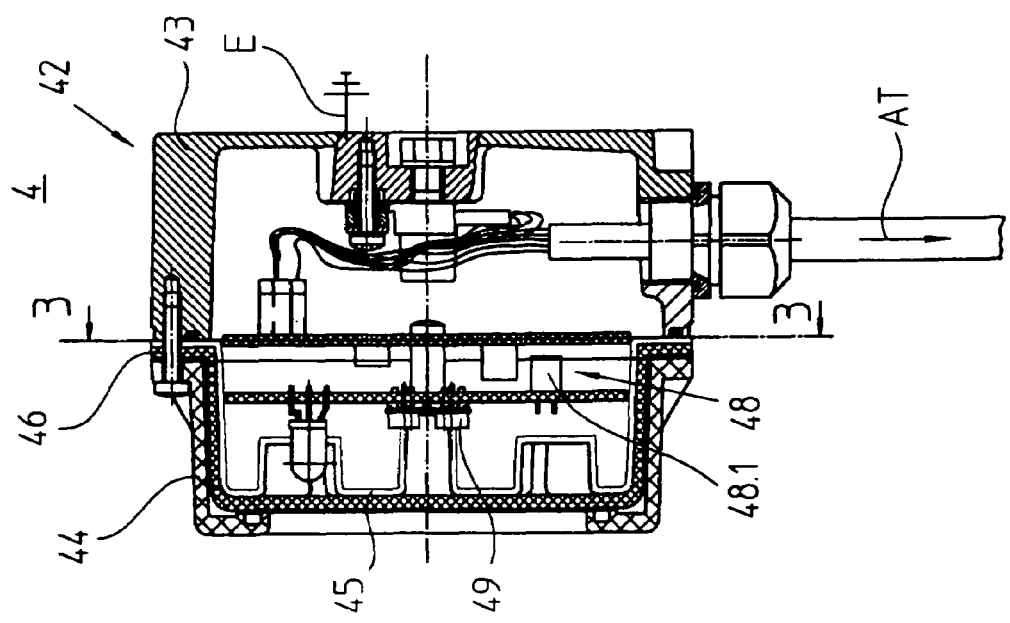
FIG. 2. a longitudinal cross-sectional view of the receiving unit of the inventive touch measurement system.

The receiving unit 4 is shown in details in FIGS. 2-4. The receiving unit 4 includes a housing 42 in the interior of which the infra-red receiver 41 is located. The housing 42 has an electrically conducting base body 43, which is connected with a reference potential E, and a window 44 which is formed of a plastic material or glass and through which the infra-red light A can penetrate. The window 44 has a shield in form of an electro-conducting coating 45 for protecting the inner space of the housing 42 from an electro-magnetic radiation. As it is particularly shown in FIG. 4, the coating 45 is provided on the inner side of the window 44 and is, thus, protected from environmental influences. The coating 45 extend to an inner side of the attachment flange 46 of the window 44, which is adjacent to the base body 43, covering the flange inner side. Therefore, in an assembled condition of the window 44 with the base body 43, the coating 45 has a good electrical contact with the outer end surface of a mounting flange 47 of the base body 43. Thus, the coating 45 becomes electrically connected with the reference potential E.

The coating 45 of the window 44 is so selected that it is permeable for infra-red light having a wave length of about 880 nm without any noticeable losses, but shields from electro-magnetic interferences. The electro-magnetic interferences are interferences defined in accordance with specific technical standards and, in particular, are electro-magnetic fields with a frequency range from 80 to 1000 MHz. The window 44 is formed preferably of a plastic material, and the electrically conducting coating 45 is formed of a metal oxide, in particular, of an oxide of a semi-conducting metal. Alternatively, the coating can be formed of silver with a thickness of several nm. In order to improve the transmission of the infra-red light, the coating is advantageously formed of several reflection-inhibitive layers. Preferably, an anti-reflection coating is used.

Figure 5:
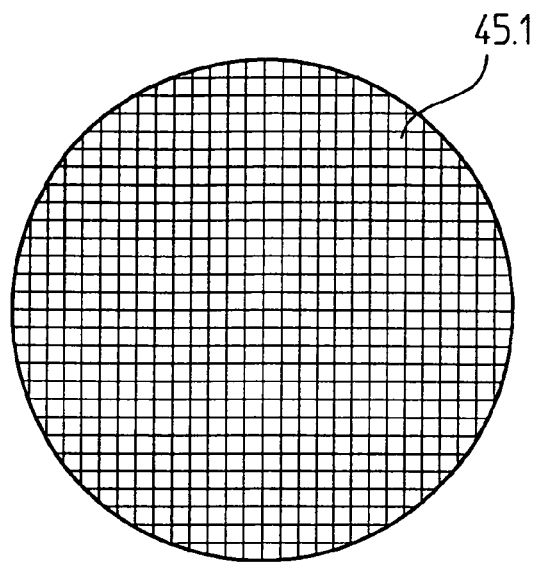
FIG. 5. a cross-sectional view of another embodiment of the window of the receiving unit of the inventive touch measurement system.
Figure 6:
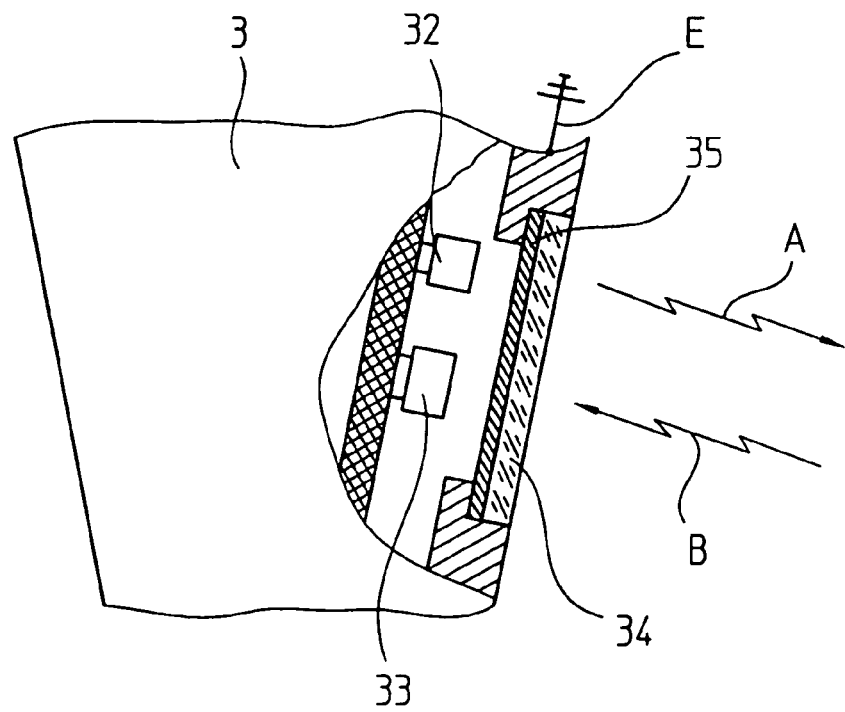
FIG. 6. a view showing a section of the window of the touch probe of the system shown in FIG. 1.

In the embodiment shown in the drawings, the coating 45 covers the entire surface of the window 44. However, it can cover only a portion of the surface of the window 44 and be formed as a grid 45.1 as shown in FIG. 5, or in form of any other suitable pattern, and form, together with the base body 43, a Faraday cage for the infra-red receiver 41 arranged in the interior of the housing 42.

The base body 43 is formed as a stable metal body. However, the base body can also be formed of a plastic material with inclusion of additive that make the base body electro-conductive. Alternatively, a plastic base body can be coated with an electrically conductive coating.

When the touch measurement system 1 according to the present invention is used with NC-machine-tool 2, it must meet greater requirements to its reliability. It should be insured that the drive 6, upon the stylus 31 touching the workpiece 5, reliably shuts down. The infra-red light A, which is emitted by the receiving unit 4, should be rapidly and correctly detected. With an operational space of the machine tool 2 increasing more and more, the transmission path between the touch probe 3 and the receiving unit 4 also increases more and more. On the other hand, drives 6 become more and more powerful, which results in a continuous increase of the range of the generated electro-magnetic interfering radiation. The present invention permits to eliminate the influence of this interference radiation on the receiving unit 4. The expenses associated with filtering of the output signal of the infra-red receiver 41 are insignificant, and the interference-free output signal can be amplified. This insures a reliable detection of the infra-red light over a long transmission path and its transformation into a triggering signal. For transformation of the output signal of the infra-red receiver 41 in a triggering signal AT, the processing unit 48 is provided with at least one amplifying element 48.1 which is located in the shielded, from interferences, housing 42.

In order to increase its sensitivity, the receiving unit 4 is provided with several infra-red receivers 41 the output signals of which are jointly transmitted to the processing unit 48 for forming the triggering signal AT. In order to detect the infra-red light A, which is emitted upon the stylus 31 touching the workpiece 5, as soon as possible, the plurality of the infra-red receivers 41 are arranged parallel to each other. Thereby, a high input current, which results from the parallel connection of the infra-red receivers 41, appears at the input of the amplifying element 48.1, so that the ratio between the input current and the noise of the amplifying element 48.1 is high.

The receiving unit 4, which is shown in FIGS. 2-3, includes several senders 49 for emitting infra-red light B though the window 44 in a direction toward the touch probe 3. For receiving the infra-red light B, at least one infra-red receiver 33 is arranged in the touch probe 3. In front of the receiver 33, there is provided a intra-red light-transmitting window 34 that has an electrically conducting coating 35 which shields the interior of the touch probe 3 from the electro-magnetic radiation. Advantageously, the window 34 with its coating 35 is also located in front of the sender element 32, and the coating 35 of the window 34 of the touch probe 3 is connected with a reference potential E for carrying away the interference voltage. The infra-red light B can be used in a per se known manner for a low-current operation of the battery-operated touch probe 3.

Though the present invention was shown and described with references to the preferred embodiment, such is merely illustrative of the present invention and is not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A touch measurement system for measuring a workpiece, comprising:
   a touch probe for detecting touching of the workpiece by a touch probe stylus and including at least one sender for emitting an infra-red light in response to detection of the touching; and
   a receiving unit including a housing having a window permeable to an infra-red light and provided with means for shielding an interior of the housing from electro-magnetic interferences, an infra-red light receiver located in the housing interior for receiving the infra-red light emitted by the sender of the touch probe, and a unit likewise located in the housing interior for processing the infra-red light received by the receiver,
   wherein the shielding means is formed as an electrically conducting coating permeable to the infra-red light, and
   wherein the coating is provided on an inner side of the window.

2. A touch measurement system according to claim 1, wherein the housing further comprises a base body connected with a reference potential, and wherein the electrically conducting coating is electrically connected with the base body.

3. A touch measurement system according to claim 2, wherein the base body has a mounting flange, wherein the window has an attachment flange connectable with the mounting flange of the base body for connecting the window with the base body, and wherein the shielding means is formed as an electrically conducting coating permeable to the infra-red light and provided on the inner side of the window and on an inner end surface of the window attachment flange, whereby the coating becomes electrically connected with the base body in an assembled condition of the window with the base body.

4. A touch measurement system according to claim 1, wherein the housing has a base body connected with a reference potential and having a circumferential mounting flange, wherein the window has an attachment flange connectable with the mounting flange of the base body for connecting the window with the base body, and wherein the coating extends over an inner end surface of the window attachment flange, whereby the coating becomes electrically connected with the base body in an assembled condition of the window with the base body.

5. A touch measurement system according to claim 1, wherein the processing unit comprises an amplifying element.

6. A touch measurement system according to claim 1, wherein the receiving unit comprises a plurality of infra-red light receivers arranged in the interior of the housing and jointly connected to the processing unit for forming a trigger signal.

7. A touch measurement system according to claim 6, wherein infra-red light receivers of the plural of infra-red light receivers are connected parallel to each other.

8. A touch measurement system according to claim 1, wherein the receiving unit further comprises at least one sender located in the interior of the housing for emitting infra-red light through the housing window, and wherein the touch probe comprises at least one receiver for receiving the infra-red light emitted by the sender of the receiving unit and located in an interior of the touch probe.

9. A touch measurement system according to claim 8, wherein the touch probe comprises a window permeable to an infra-red light and located in front of the touch probe receiver for protecting the touch probe interior from electro-magnetic interferences.

10. A touch measurement system according to claim 9, wherein the touch probe window covers the touch probe sender.

11. A touch measurement system for measuring a workpiece, comprising:
   a touch probe for detecting touching of the workpiece by a touch probe stylus and including at least one sender for emitting an infra-red light in response to detection of the touching; and
   a receiving unit including a housing having a window permeable to an infra-red light and provided with means for shielding an interior of the housing from electro-magnetic interferences, an infra-red light receiver located in the housing interior thru receiving the infra-red light emitted by the sender of the touch probe, and a unit likewise located in the housing interior or processing the infra-red light received by the receiver,
   wherein the shielding means is formed as an electrically conducting coating permeable to the infra-red light, and
   wherein the housing further comprises a base body connected with a reference potential, and wherein the shielding means is electrically connected with the base body.

12. A touch measurement system according to claim 11, wherein the coating is provided on an inner side of the window.

13. A touch measurement system according to claim 12, wherein the base body has a mounting flange, wherein the window has an attachment flange connectable with the mounting flange of the base body for connecting the window with the base body, and wherein the shielding means is formed as an electrically conducting coating permeable to the infra-red light and provided on the inner side of the window and on an inner end surface of the window attachment flange, whereby the coating becomes electrically connected with the base body in an assembled condition of the window with the base body.

14. A touch measurement system according to claim 11, wherein the housing has a base body connected with a reference potential and having a circumferential mounting flange, wherein the window has an attachment flange connectable with the mounting flange of the base body for connecting the window with the base body, and wherein the coating extends over an inner end surface of the window attachment flange, whereby the coating becomes electrically connected with the base body in an assembled condition of the window with the base body.

15. A touch measurement system according to claim 11, wherein the processing unit comprises an amplifying element.

16. A touch measurement system according to claim 11, wherein the receiving unit comprises a plurality of infra-red light receivers arranged in the interior of the housing and jointly connected to the processing unit for forming a trigger signal.

17. A touch measurement system according to claim 11, wherein infra-red light receivers of the plurality of infra-red light receivers are connected parallel to each other.

18. A touch measurement system according to claim 11, wherein the receiving unit further comprises at least one sender located in the interior of the housing for emitting infra-red light through the housing window, and wherein the touch probe comprises at least one receiver for receiving the infra-red light emitted by the sender of the receiving unit and located in an interior of the touch probe.

19. A touch measurement system according to claim 18, wherein the touch probe comprises a window permeable to an infra-red light and located in front of the touch probe receiver for protecting the touch probe interior from electro-magnetic interferences.

20. A touch measurement system according to claim 19, wherein the touch probe window covers the touch probe sender.

* * * * *